(12) United States Patent
Fuller

(10) Patent No.: US 7,203,554 B2
(45) Date of Patent: Apr. 10, 2007

(54) MODEL PREDICTIVE CONTROLLER WITH LIFE EXTENDING CONTROL

(75) Inventor: James W. Fuller, Amston, CT (US)

(73) Assignee: United Technologies Corporation, Hartford, CT (US)

( * ) Notice: Subject to any disclaimer, the term of this patent is extended or adjusted under 35 U.S.C. 154(b) by 258 days.

(21) Appl. No.: 10/801,235

(22) Filed: Mar. 16, 2004

(65) Prior Publication Data

US 2005/0209713 A1    Sep. 22, 2005

(51) Int. Cl.
G05B 13/02 (2006.01)
G06F 19/00 (2006.01)

(52) U.S. Cl. .......................... 700/28; 700/29; 700/30; 700/121

(58) Field of Classification Search ................ 700/121, 700/28, 29, 30, 173, 186, 109, 110, 112, 117, 700/106, 119, 48, 95, 32, 44; 438/14, 17, 438/5, 6
See application file for complete search history.

(56) References Cited

U.S. PATENT DOCUMENTS

| | | | | |
|---|---|---|---|---|
| 5,351,184 A * | 9/1994 | Lu et al. | | 700/45 |
| 5,410,883 A * | 5/1995 | Nigawara et al. | | 60/646 |
| 5,541,833 A * | 7/1996 | Bristol et al. | | 700/45 |
| 6,167,360 A * | 12/2000 | Erickson et al. | | 703/6 |
| 6,373,033 B1 * | 4/2002 | de Waard et al. | | 219/497 |
| 6,735,483 B2 * | 5/2004 | Martin et al. | | 700/29 |
| 6,745,088 B2 * | 6/2004 | Gagne | | 700/29 |
| 6,823,675 B2 * | 11/2004 | Brunell et al. | | 60/773 |
| 6,925,338 B2 * | 8/2005 | Eryurek et al. | | 700/30 |
| 6,970,857 B2 * | 11/2005 | Card et al. | | 706/19 |
| 6,988,017 B2 * | 1/2006 | Pasadyn et al. | | 700/121 |
| 2002/0021900 A1 | 2/2002 | Lant et al. | | |
| 2005/0007249 A1 * | 1/2005 | Eryurek et al. | | 340/511 |

FOREIGN PATENT DOCUMENTS

| EP | 0 524 317 | 1/1993 |
|---|---|---|
| EP | 1 316 866 | 6/2003 |

OTHER PUBLICATIONS

Gallestey et al. "Model Predictive Control and Optimization of Power Plant Load While Considering Lifetime Consumtion", Feb. 2002, IEEE Transactions on power systems, vol. 17 No. 1, pp. 186-191.*

(Continued)

*Primary Examiner*—Thomas K. Pham
(74) *Attorney, Agent, or Firm*—Carlson, Gaskey & Olds

(57) ABSTRACT

An MPC Control system provides a life extending control that includes life-extending goals in the performance index of the MPC controller and limits in the inequality equations. The MPC controller performs the normal functions of a control system for a physical system, but does so in a manner that extends the life or time-to-next maintenance or reduces the number of parts that need to be replaced. If the life extending functions do not degrade other control functions, they can be always enabled, making the system less expensive to maintain. If the life extending functions degrade some other control functions, they can be adjusted in-the-field or on-the-fly to stretch the time-until-maintenance until it is more convenient, but with some impact on performance.

21 Claims, 1 Drawing Sheet

OTHER PUBLICATIONS

European Search Report, May 22, 2006.
Ray et al: "Damage-Mitigating Control: An Interdisciplinary Thrust Between Controls and Material Science," Proceedings of the American Control Conference, Jun. 29, 1994.

Donglin Li et al: "Damage Modeling and Life Extending Control of a Boiler-Turbine System," Proceedings of 2003 American Control Conference, Jun. 4, 2003.

* cited by examiner

MODEL PREDICTIVE CONTROLLER WITH LIFE EXTENDING CONTROL

This invention was conceived in performance of work under U.S. Government Contract N00421-01-2-0131.

BACKGROUND OF THE INVENTION

The present invention relates generally to control systems and more particularly to a model predictive control system with life extending control.

It is known that computer-based controllers can impact the required maintenance schedule of the systems they operate and that they can operate in such a manner as to reduce stresses that pace the life or time-to-repair. Various control logic schemes are known that implicitly effect a tradeoff of performance and life in their design. However, these tradeoffs are built-in and cannot be varied on the fly. Some systems have the ability to switch between a normal run mode and a life-extending mode, but they are simply either "on" or "off." The system cannot choose a varying level of life-extending functions or tailor specific life-extending functions for a specific component that is failing.

Model predictive controllers (MPC) can operate multivariable systems to provide uncoupled command responses while meeting various physical and operational limits. MPC controllers mathematically optimize a performance index in realtime in order to determine the actuator commands. It is also known that the relative weights in a MPC performance index and the limit values can be changed in the field. However, MPC controllers have not been implemented with explicit life-extending functions in the performance index or limit equations.

SUMMARY OF THE INVENTION

The present invention provides a life extending control that performs the normal functions of a control system for a physical system, such as a gas turbine engine, but does so in a manner that extends the life or time-to-next maintenance or reduces the number of parts that need to be replaced. In the disclosed embodiment of the present invention, the life-extending functions are implemented in an MPC controller for the system by explicitly including life-extending functions in the performance index and life oriented limits in the inequality equations. As a result, the life-extending functions can be varied on the fly, can be tailored to the specific situation (such as a failure of a specific component), and are continuously variable because they are implemented in terms of weighting factors in the MPC performance index and/or limits in the MPC inequality equations.

If the life extending functions do not degrade other control functions, they can always be enabled, making the system less expensive to maintain. If the life extending functions degrade some other control functions, they can be adjusted in-the-field or on-the-fly to stretch the time-until-maintenance until it is more convenient, but with some impact on performance.

One valuable use of this stretching is in condition-based maintenance programs. These programs require that needed maintenance be predicted far enough in advance so that parts can be ordered and shop resources reserved. Once maintenance has been scheduled, it is important that the plant not need maintenance sooner. Stretching life can help ensure this. Other maintenance schemes are also improved by the ability to sometimes stretch life of a plant based upon its remaining life used.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENTS

Figure 1:
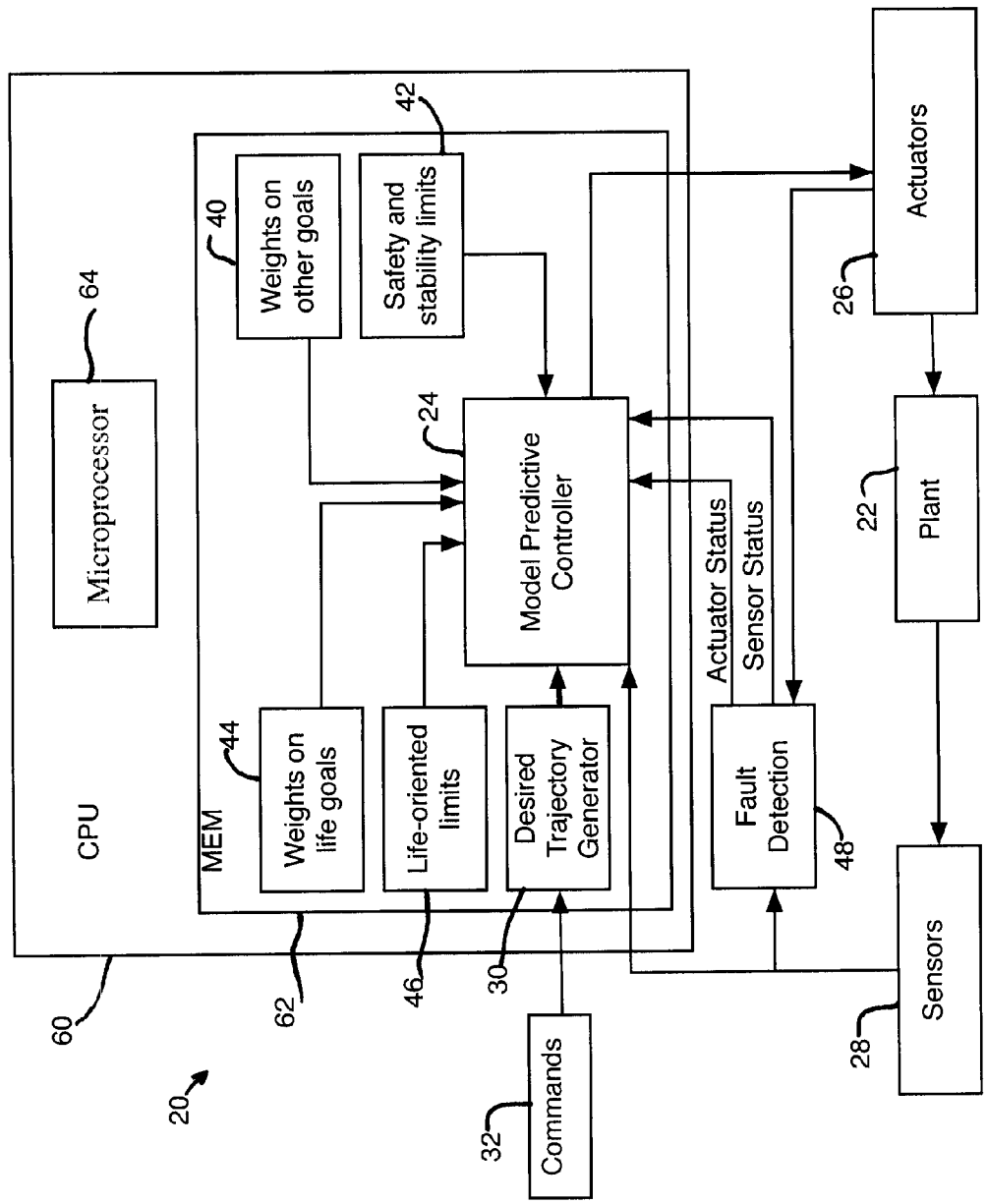
FIG. 1 schematically illustrates a model predictive control system according to the present invention.

A model predictive control system 20 according to the present invention is shown schematically in FIG. 1. The system 20 includes a Model Predictive Controller (MPC) 24 for controlling a plant 22 with actuators 26 based upon feedback from sensors 28 and based upon a desired trajectory. The desired trajectory generator 30 determines a desired trajectory based upon input commands 32, such as from a user.

In model predictive control, actuator commands, u, are determined as the result of solving an optimization problem in real time. Model predictive control is a type of digital controller. Digital controllers are based on a computer that periodically samples operator commands and measured responses. As a consequence of each sample, the digital controller specifies new actuator settings, which is referred to as a controller update. These settings are most often held until the next update. MPC specifies these settings as the first time point of an actuator trajectory. The trajectory specifies u(n), for controller update times numbered with integer n, where n varies from L to N+L−1. That is, for N time points. The current sample time is enumerated L. This actuator trajectory is determined as the unique trajectory that minimizes the performance index, PI, where $$PI = \frac{1}{2} x_{N+L}^T M_{N+L}^T M_{N+L} x_{N+L} +$$

$$\frac{1}{2} \sum_{n=L}^{N+L-1} [x^T \ u^T] \begin{bmatrix} C^T \\ D^T \end{bmatrix} Q^{T/2} Q^{1/2} [C \ D] \begin{bmatrix} x \\ u \end{bmatrix}_n +$$

$$[f_n^T \ g_n^T] \begin{bmatrix} x \\ u \end{bmatrix}_n + u^T R^{T/2} R^{1/2} u_n$$

and where the summation is over the N future time points, $x_n$ is a vector of the states of a system dynamic model and $u_n$ are the actuator commands at each of the N time points. The matrices C and D are coefficients of linearized output equations, which relate system outputs for which there are goals to the dynamic model states and actuator settings. Q and R are lower triangular weighting matrices, and vectors f and g are driving terms that are functions of a desired trajectory for the system output, desired or nominal actuator values, and weighting matrices Q and R. Lower triangular matrix M is a terminal-weighting matrix and may be present for a variety of control theoretic reasons.

The nominal system and, therefore, the optimization must obey the state dynamics model of the system $$x_{n-1} = A_n \cdot x_n + B_n \cdot u_n + b_n$$

which optimization procedures term equality constraints. The optimization must also obey the physical and operational limits linked to the dynamics Limited variables $yc(n) = Cc_n \cdot x_n + Dc_n \cdot u_n + a_n \leq Y_n$ for the N time points. The equality represents a model of how the limited variables are linked to the state dynamics model. The inequality indicates the limited variable should remain less than the limit, Y. The explicit inclusion of the limit equation in the theory and resulting logic design is a key advantage of MPC.

The MPC designer specifies the control algorithm by determining the state dynamics model, the limit model, and the performance index. Performance index design involves selecting the variables to include in output vector, y, and choosing the weighting matrices Q, R, and M. The control software designer must also provide reusable software for solving the optimization problems in real time. One specific implementation of an MPC control system 20 and an MPC controller 24 that could be used in the present invention is disclosed in more detail in co-pending application U.S. Ser. No. 10/620,569, filed Jul. 16, 2003, entitled "A SQUARE ROOT METHOD FOR COMPUTATIONALLY EFFICIENT MODEL PREDICTIVE CONTROL," which is co-owned and which has the same inventor as the present application and which is hereby incorporated by reference in its entirety.

The weighting matrices Q, R and M in the MPC controller 24 reflect the weighting on goals such as stability, safety, performance, etc stored in "weights on other goals" 40, which are implemented in the performance index of the MPC controller 24. Limits for purposes of maintaining stability and safety are stored in "safety and stability limits" 42 and implemented in the MPC controller 24 as inequality equations.

In the system 20 shown in FIG. 1, there are also weights on life goals 44, which are also implemented in the weighting matrices Q, R and M for the MPC controller 24. There are also life-oriented limits 46 which are implemented with additional inequality equations for the MPC controller 24.

The system 20 further, optionally, includes fault detection circuitry and feedback 48 which monitors the sensors 28 and actuators 26. The fault detection circuitry and feedback 48 sends signals to the MPC controller 24 indicating the current states of the sensors 28 and actuators 26, including whether they are operating normally, have partially failed, or have completely failed.

In operation, in the case where the life-extending functions do not degrade the other control system functions, the MPC controller 24 always uses a performance index and inequality equations that take into account the life-extending weights 44 and limits 46. In that case, the plant 22 will simply require less maintenance.

In the case where the life-extending functions do degrade other control system functions, the performance index of the MPC controller 24 normally does not include nominal life-extending weights 44 and the inequality equations include nomimal life-oriented limits 46. While operating normally, it may be determined that maintenance of a particular component of the plant 22 is required. This may be a regularly scheduled maintenance reminder (based upon time in operation or time since the last maintenance) or a specific manual request for maintenance (either by the operator or by a central maintenance facility). The life-extending weights 44 can then be increased and the life limits 46 are then decreased, as implemented in the MPC controller 24, in order to stretch the time until maintenance for that component of the plant 22 until the maintenance can be performed. This may be a known time in the future, like when the replacement part will be available, when maintenance resources will be available, or when the plant 22 is already scheduled for maintenance. Stretching the time-to-maintenance can provide continued operation of the plant 22 until the time for maintenance.

Conversely, in emergency situations, a system such as a aircraft engine might increase overall safety if its output were increase in speed or magnitude. In these situations the life of the plant is secondary to the need for safety and the weight on the life goals can be reduced and the life limits increased.

Additionally, the fault detection circuitry and feedback 48 may determine that one or more of the actuators 26 and sensors 28 requires maintenance (including complete replacement of the actuator 26 or sensor 28). This actuator status and sensor status is indicated to the MPC controller 24, which then adopts or changes at least some of the weights 44 and limits 46 in the performance index and inequality equations The weights 44 and limits 46 may also be altered (increased or decreased) based upon the actuator status, sensor status, regular maintenance schedule or specifically-scheduled maintenance. Thus, the life-extending functions are not simply on or off, but a continuously variable factor that depends upon the severity of the failure of the component of the plant 22 and upon the expected time-to-maintenance. More severe problems would invoke higher weights 44 and lower limits 46, to the extent that it is necessary to degrade other system functions during the extended time-to-maintenance. The life extending goals (weights 44 and limits 46) are balanced with performance, energy use, stability, robustness and the scope or cost of the maintenance. In the event that the scheduled maintenance cannot be performed at the scheduled time, the MPC controller 24 continues to implement and adjust (if necessary) the life-extending weights 44 and limits 46 until maintenance can be obtained.

The MPC controller 24 is preferable implemented on a CPU 60 having storage and memory 62 (such as RAM, ROM, hard drives, or any other optical, magnetic, electronic or other media for storing computer data and computer programs). The weights on life goals 44, life-oriented limits 46, weights on other goals 40, safety and stability limits 42 are preferably stored in the storage and memory 62, as is the program module for the model predictive controller 24 and the desired trajectory generator 30. When executed by a processor 64, these computer programs and data perform the functions described above. Although the particular implementation will depend upon the particular application and the particular plant 22 to be controlled, one of skill in the art could write the necessary computer programs and provide suitable hardware based upon the description herein.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope. Alphanumeric identifiers for steps in the method claims are for ease of reference by dependent claims, and do not indicate a required sequence, unless otherwise indicated.

What is claimed is:

1. A model predictive control system comprising:
a plurality of sensors indicating a current state of the system;
a desired trajectory generator for creating a desired dynamic response based upon commands;
a model of plant dynamics;
starting with the current state of the system, a nonlinear programming module receiving the desired dynamic response and at least one system life goal and formulating a problem of achieving the desired dynamic response and the at least one system life goal for a window spanning one or more time steps as a solution to a nonlinear program problem using methods of model predictive control;

a nonlinear programming solver solving the nonlinear programming problem in each time step using an iterative algorithm based upon the model predictive control problem and a nonlinear programming algorithm, the solver generating a plurality of actuator commands for achieving the desired dynamic response based upon the solution to the nonlinear programming problem; and a plurality of actuators receiving the plurality of actuator commands from the nonlinear programming solver and acting upon the system to implement the desired dynamic response in accordance with the at least one system life goal.

2. The model predictive control system of claim 1 wherein the at least one system life goal includes at least one limit.

3. A model predictive control system comprising:
a plurality of sensors indicating a current state of the system;
a desired trajectory generator for creating a desired dynamic response based upon commands;
a model of plant dynamics;
starting with the current state of the system, a nonlinear programming module receiving the desired dynamic response and at least one system life goal in a performance index and formulating a problem of achieving the desired dynamic response and the at least one system life goal for a window spanning one or more time steps as a solution to a nonlinear program problem using methods of model predictive control, the at least one system life goal including at least one limit equation, wherein the plant dynamic model and limit equation are linear and the performance index is quadratic so as to form a quadratic programming problem; and
a nonlinear programming solver solving the nonlinear programming problem in each time step using an iterative algorithm based upon the model predictive control problem and a nonlinear programming algorithm, wherein the nonlinear programming solver is a quadratic programming solver.

4. The model predictive control system of claim 3 wherein the at least one system life goal changes based upon a change in a status signal.

5. The model predictive control system of claim 4 wherein the status signal is generated by a sensor.

6. The model predictive control system of claim 4 wherein the status signal indicates the status of an actuator.

7. A method for controlling a multivariable system including the steps of:
a) receiving a plurality of sensor signals indicating current conditions of the system;
b) receiving a plurality of commands;
c) receiving at least one system life goal;
d) determining a desired dynamic response of the system based upon the commands;
e) implementing a balance between the desired dynamic response and the at least one system life goal in a model predictive controller to generate a plurality of actuator commands; and
f) sending the plurality of actuator commands to a plurality of actuators acting upon the system in real time.

8. The method of claim 7 wherein said step e) is performed by weighting in a performance index for the model predictive controller.

9. The method of claim 8 further including the step of changing the balance between the desired dynamic response and the at least one system life goal.

10. The method of claim 9 further including the step of changing the weighting in the performance index to change the balance.

11. The method of claim 10 further including the step of changing the weighting based upon an indication of a failure of a component in the system.

12. The method of claim 11 further including the step of changing the limit based upon an indication of a time-to-maintenance of the system.

13. The method of claim 10 wherein said step e) further includes the step of setting a limit in a set of inequality equations for the model predictive controller.

14. The method of claim 13 further including the step of changing the limit based upon an indication of a time-to-maintenance.

15. The method of claim 13 further including the step of changing the limit based upon an indication of a failure of a component in the system or the declaration of an emergency.

16. The method of claim 7 wherein said step e) further includes the step of setting a limit in a set of inequality equations for the model predictive controller.

17. A method for controlling a multivariable system including the steps of:
a) receiving a plurality of sensor signals indicating current conditions of the system;
b) receiving a plurality of commands;
c) receiving at least one system life goal;
d) determining a desired dynamic response of the system based upon the commands; and
e) implementing a balance between the desired dynamic response and the at least one system life goal in a model predictive controller to generate a plurality of actuator commands, including the steps of setting a limit in a set of inequality equations for the model predictive controller and changing the limit based upon an indication of a time-to-maintenance.

18. The method of claim 16 further including the step of changing the limit based upon an indication of a failure of a component in the system or the declaration of an emergency.

19. A computer readable medium storing a computer program, which when executed by a computer performs the steps of:
a) receiving a plurality of sensor signals indicating current conditions of the system;
b) receiving a plurality of commands;
c) receiving at least one system life goal;
d) determining a desired dynamic response of the system based upon the commands; and
e) implementing a balance between the desired dynamic response and the at least one system life goal in a model predictive controller to generate a plurality of actuator commands.

20. The computer readable medium of claim 19 wherein the computer program, when executed by a computer further performs the step of:
f) repeating step a) to sense the current conditions as affected by the plurality of actuator commands.

21. The computer readable medium of claim 19 wherein the computer program, when executed by a computer further performs the step of performing said steps a–f) iteratively in real time.

* * * * *